(12) United States Patent
Makinen et al.

(10) Patent No.: US 7,647,062 B2
(45) Date of Patent: Jan. 12, 2010

(54) CONTROL OF TRANSMISSION POWER IN A RADIO SYSTEM

(75) Inventors: Jarmo Makinen, Espoo (FI); Jari Rahkala, Ratingen (DE)

(73) Assignee: Nokia Corporation, Espoo (FI)

( * ) Notice: Subject to any disclaimer, the term of this patent is extended or adjusted under 35 U.S.C. 154(b) by 731 days.

(21) Appl. No.: 09/909,039

(22) Filed: Jul. 19, 2001

(65) Prior Publication Data

US 2002/0045460 A1    Apr. 18, 2002

Related U.S. Application Data

(63) Continuation of application No. PCT/FI00/00038, filed on Jan. 18, 2000.

(30) Foreign Application Priority Data

Jan. 19, 1999   (FI) .................................... 990095

(51) Int. Cl.
*H04B 7/00* (2006.01)

(52) U.S. Cl. ................... 455/522; 455/63.1; 455/67.11; 455/67.13; 455/69; 455/115.1; 370/318

(58) Field of Classification Search ................. 455/522, 455/69, 67.11, 67.13, 63.1; 370/313, 33.3, 370/318, 333
See application file for complete search history.

(56) References Cited

U.S. PATENT DOCUMENTS

| | | | |
|---|---|---|---|
| 4,788,696 A * | 11/1988 | Sakane et al. ............... | 714/705 |
| 5,128,965 A | 7/1992 | Henriksson | |
| 5,727,033 A * | 3/1998 | Weaver et al. ............... | 375/358 |
| 5,822,318 A * | 10/1998 | Tiedemann et al. .......... | 370/391 |
| 5,873,028 A * | 2/1999 | Nakano et al. ................ | 455/69 |
| 5,878,329 A * | 3/1999 | Mallinckrodt ............... | 455/522 |
| 5,940,430 A * | 8/1999 | Love et al. ................... | 375/130 |
| 6,035,210 A * | 3/2000 | Endo et al. ................... | 455/522 |
| 6,075,974 A * | 6/2000 | Saints et al. .................. | 455/69 |
| 6,175,744 B1 * | 1/2001 | Esmailzadeh et al. ........ | 455/522 |
| 6,222,877 B1 * | 4/2001 | Govindarajan .............. | 375/224 |

(Continued)

FOREIGN PATENT DOCUMENTS

EP    0428099 B1    5/1991

(Continued)

OTHER PUBLICATIONS

International Search Report for PCT/FI00/00038.

(Continued)

*Primary Examiner*—Charles N Appiah
*Assistant Examiner*—Willie J Daniel, Jr.
(74) *Attorney, Agent, or Firm*—Squire, Sanders & Dempsey, L.L.P.

(57) ABSTRACT

The invention relates to a method for controlling transmission power in a radio system, preferably in a radio link system. To establish a power control mechanism which is capable of taking into account the various phenomena affecting the performance of the radio connection and which can also respond to degrading signal quality before bit errors begin to occur, pseudo errors, i.e. decision-making instants at which a symbol error nearly occurred, are monitored at the receiving end. The transmission power is then decreased when the rate of the pseudo errors is below a predetermined threshold and increased when pseudo errors occur so that a predetermined criterion is fulfilled.

42 Claims, 3 Drawing Sheets

U.S. PATENT DOCUMENTS

| | | | |
|---|---|---|---|
| 6,259,928 B1 * | 7/2001 | Vembu | 455/522 |
| 6,272,335 B1 | 8/2001 | Nakayama et al. | |
| 6,324,207 B1 * | 11/2001 | Kanterakis et al. | 375/141 |
| 6,487,686 B1 * | 11/2002 | Yamazaki et al. | 714/703 |
| 6,526,261 B1 * | 2/2003 | Takeuchi et al. | 455/69 |
| 6,587,510 B1 * | 7/2003 | Minami et al. | 375/285 |

FOREIGN PATENT DOCUMENTS

| | | |
|---|---|---|
| EP | 0847146 A2 | 6/1998 |
| JP | 2193434 | 7/1990 |
| JP | 7050872 | 2/1995 |
| JP | 10079724 | 3/1998 |
| JP | 10-145293 | 5/1998 |
| JP | 10322267 | 12/1998 |
| WO | WO 96/31014 | 10/1996 |
| WO | WO 98/11677 | 3/1998 |
| WO | WO 98/18212 | 4/1998 |
| WO | WO 98/56120 | 12/1998 |
| WO | WO 98/59432 | 12/1998 |

OTHER PUBLICATIONS

Official communication issued in the corresponding JP Application, dated Aug. 18, 2008.

* cited by examiner

CONTROL OF TRANSMISSION POWER IN A RADIO SYSTEM

This application is a continuation of international application Ser. No. PCT/FI00/00038, filed 18 Jan. 2000.

FIELD OF THE INVENTION

The invention relates generally to a radio system. More specifically, the invention relates to automatic transmission power control in a radio system. Primary applications of the invention are in fixed radio links.

BACKGROUND OF THE INVENTION

In constructing fixed digital radio link connections, it is essential that the probability of the connection being broken remains sufficiently low. In addition to equipment reliability, this probability is dependent on phenomena in the radio path affecting the radio wave propagation. Such phenomena include:
1. normal free-space attenuation,
2. attenuation caused by rain, slowly changing in frequency and time,
3. splitting of the signal propagation path, due to changes in the atmospheric refractive index or reflections caused by terrain obstructions, into two or more routes (multipath propagation), and frequency-selective attenuation caused by the interaction of said routes, and
4. interference arriving at the receiver from other radio link hops or other equipment.

Consequently, the transmission power of the transmitter should be temporarily increased so that additional signal attenuation on account of phenomena 2 and 3 alone or in combination are not capable of excessively degrading the quality of the signal received. However, high transmission power increases, on the other hand, interference in adjacent channels and radio hops. This effect from phenomenon 4 of the increased interference brings about deterioration of the sensitivity of other receivers. Furthermore, high transmission power hinders the implementation of dense radio link networks and efficient utilization of the frequencies available for radio link systems.

The task of an automatic power control in a radio link system is to continuously adjust the transmission power of the transmitter according to the changes affecting the quality of the signal received so that error-free reception can be ensured as well as possible.

The power control mechanism has conventionally been implemented by making a signal level measurement on the received signal at the far end of the radio hop. Then a signal representing the measured signal level is sent through a return channel to the transmitter and the transmission power is controlled so that the level of the received signal remains substantially constant at the receiving end.

A major drawback of this kind of power control system is that it is not capable of taking into account the effects of external interferences (phenomenons 3 and 4) on the signal quality.

Some other known power control mechanisms are based on bit error measurement at the receiving end of the radio hop. In response to this measurement, the transmission power at the opposite end is then controlled in such a way that a predetermined error threshold is not exceeded at the receiving end. In this way, the effect of external interference can be taken into account in the power control, at least to some extent.

In addition to bit error measurement, the power control mechanism can also be based on other measurements made at the receiving end. A more sophisticated power control mechanism such as this is described in EP-B1-0428099. In this power control mechanism, the bit error rate and the rate of change of the received signal level are estimated by the receiver. If either the error rate estimate or, alternatively, the rate of change in the received signal level exceeds a respective predetermined threshold value, the transmission power is temporarily increased to a value appreciably higher than the normal transmission power but lower than the maximum transmission power. On the other hand, should both the error rate estimate and the rate of change in the received signal level simultaneously exceed the respective predetermined threshold value, the transmission power is increased to its maximum value for a predetermined time. This is done independently of the level of the received signal. After the predetermined time has elapsed, the transmitter power is gradually decreased until a certain signal level is reached, until bit errors appear again or until the rate of change of the received signal level exceeds the respective threshold value.

The drawback relating to the above known power control mechanisms based on bit error monitoring is that bit errors degrade the signal quality before the transmitter power can be increased. Furthermore, in systems such as the one described in EP-B1-0428099, the high or full transmission power may often be more than what is actually needed for error-free reception. Thus unnecessary interference may be generated for adjacent radio channels or systems.

SUMMARY OF THE INVENTION

The purpose of the present invention is to eliminate the drawbacks described above and to provide a power control mechanism which is capable of taking into account all the above phenomena affecting the performance of radio connections and which can also respond to degrading signal quality before bit errors begin to occur.

This objective is achieved with the solution defined in the independent patent claims.

The invention is based on the detection of events called pseudo errors. In this context, "pseudo error" refers to a decision-making instant when a bit or symbol error nearly occurred, i.e. to instants when the right decision was actually made but the margin for the right decision was smaller than a certain limit value so that an actual error was a close thing. The idea of the invention is to detect these pseudo errors at the receiving end and to decrease and maintain the transmission power at as low a level as possible so that pseudo errors occur only at rather long intervals. This is accomplished by lowering the transmission power from a higher initial value until pseudo errors begin to occur and then maintaining the power at a correct level by increasing the power by a small amount when pseudo errors are detected and decreasing the power if the rate of the pseudo errors remains below a predetermined threshold.

With the solution in accordance with the invention, the transmission power can under all conditions be adjusted to a level which is just above the level where actual errors start to appear, irrespective of the actual signal level received (unless the signal level is included as a simultaneous adjustment criterion). Thus, the system is able to respond before any bit errors reach the destination. Furthermore, no periods of high transmission power are needed which could cause unnecessary interference for the adjacent systems or channels.

A further advantage of the invention is that a power control system can be introduced at low cost to the existing radio link terminals. This is explained in more detail below.

BRIEF DESCRIPTION OF THE DRAWINGS

In the following, the invention and its preferred embodiments are described in closer detail by way of example with reference to the accompanying drawings, wherein.

DETAILED DESCRIPTION OF THE INVENTION

Figure 1:
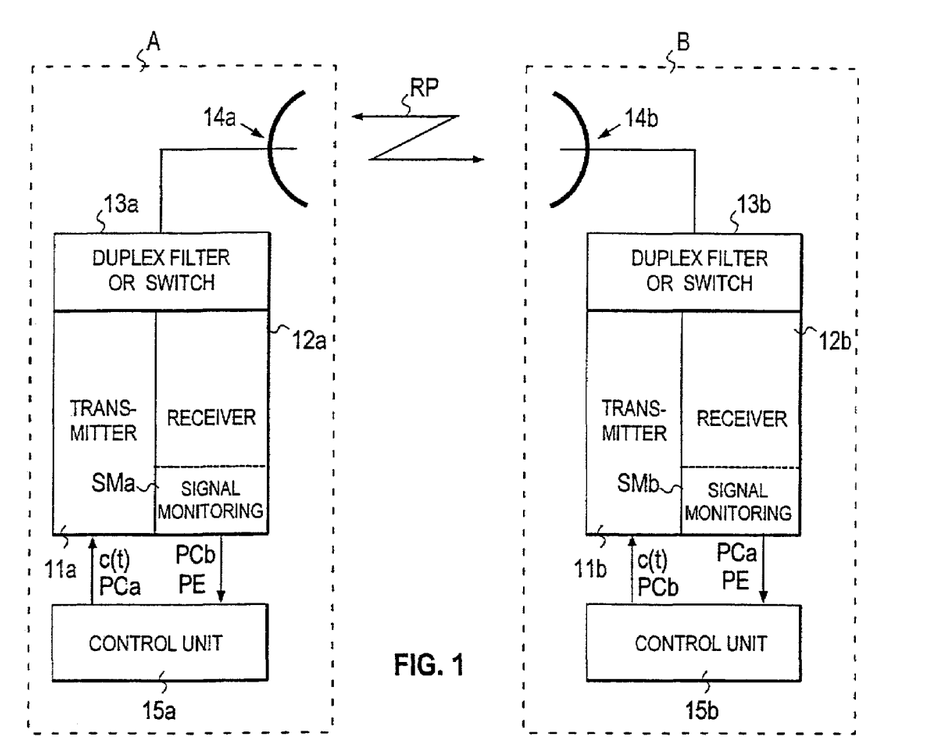
FIG. 1 shows a radio link system in accordance with the invention on a general level.

In the following, the invention is described using as an example a radio link system constituting a bidirectional point-to-point connection. FIG. 1 illustrates a digital radio link system of this type on a general level. The system comprises two radio link terminals A and B, communicating with one another via a radio path RP. The figure uses like reference numerals for like parts, so that for radio link terminal A the reference numeral includes the letter a and for radio link terminal B the letter b. The transmitter (11a and 11b) and receiver (12a and 12b) of each link terminal are connected through a duplex filter, or alternatively through a switch (13a and 13b), to an antenna system (14a and 14b). Duplex filters are used when a bidirectional connection is desired, so that traffic passes simultaneously in both directions. The task of duplex filters is to separate the signals of the transmitter and receiver from each other. Duplex filters can be replaced with switches in a link system utilizing time division duplex communication.

Both link terminals further comprise a control unit (15a and 15b, respectively) for controlling the link terminals and for performing measurements involved in the system, which may in practice involve several different tasks. However, from the point of view of the invention, the essential functionality of each control unit is that it controls the transmission power of the transmitter at the same end of the radio hop and sends a power control message to the opposite end of the radio hop.

Both receivers further include signal monitoring means (SMa and SMb) for monitoring the quality of the received signal. According to the invention, these signal monitoring means monitor at least the pseudo error occurrence in the receiver. In the preferred embodiments of the invention, further power adjustment criteria are used in addition to the pseudo error occurrence. Therefore, in these embodiments signal PE from the receiver may also include other measurement information besides data relating to the occurrence of pseudo errors. These preferred embodiments are described below after the control algorithm based on pseudo error occurrence has been described. The signal monitoring means or a part thereof can also be located in the control unit.

In the transmission direction from link terminal A to link terminal B, power control occurs as follows. Control unit 15b receives a pseudo error signal PE from the signal monitoring means in receiver 12b, i.e. a signal indicating whether pseudo errors have been detected in receiver 12b. On the basis of the contents of this signal, control unit 15b applies a power control message PCb to transmitter 11b which sends the said message through a return channel to the opposite end of the radio hop. Control unit 15a at the opposite end receives this message and in response controls the transmission power of transmitter 11a by supplying a control signal c(t) to the transmitter. In the opposite transmission direction power control is performed in the same way by the corresponding unit at the opposite end. In other words, letter a should be changed to letter b, and vice versa, in the reference numerals of the above description.

The power control mechanism according to the present invention operates as follows.

1. Pseudo errors are monitored essentially continuously at the receiving end of the radio hop.
2. The transmission power of the transmitter is gradually decreased from its initial value which was set high enough so that no pseudo errors are detected at the receiving end, until the first pseudo error occurs. The transmission power is preferably decreased in small steps, consuming a sufficient time period at each step.
3. The transmitting end increases its transmission power by a small predetermined amount when one or more pseudo errors are detected. The transmission power is again decreased later, if no pseudo errors are detected within a time interval of predetermined length.

Figure 2:
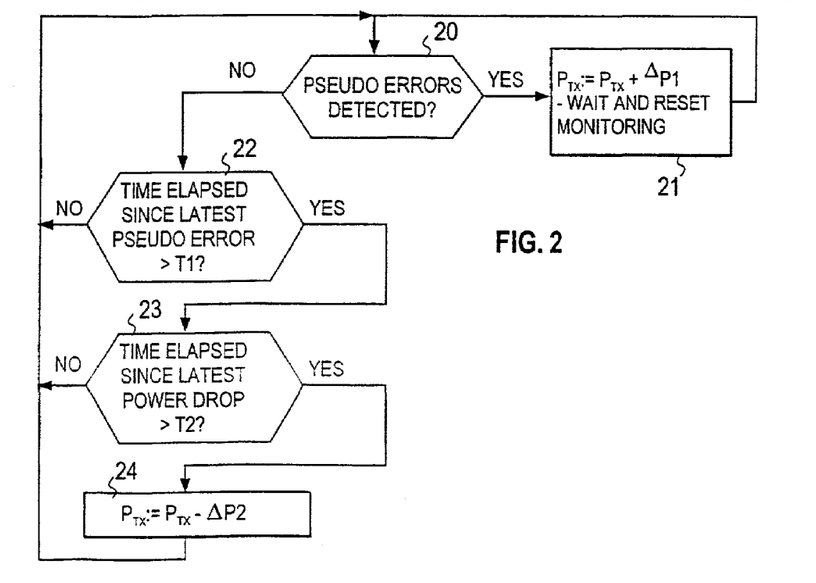
FIG. 2 is a flow chart illustrating one embodiment of the power control method in accordance with the present invention.

FIG. 2 is a flow chart illustrating one embodiment of the power control method in accordance with the present invention. The figure illustrates steps of the method to be performed in addition to the monitoring of the pseudo errors, i.e. pseudo error monitoring is a background process for the steps shown in FIG. 2. If it is detected (phase 20) by the receiver that a pseudo error has occurred, the transmission power of the transmitter (at the opposite end) is increased immediately by a predetermined small amount ΔP1, such as 1 or 2 dB (phase 21). After this, the system waits for a certain short delay period before it resets the variables used in connection with the pseudo error monitoring and starts the monitoring again (phase 21). The purpose of the delay is to ensure that the transmission power has reached its new value before the pseudo error monitoring is started again.

If no pseudo errors are detected, the system examines whether a sufficient time period (T1) has elapsed since the latest pseudo error (phase 22). If this is not the case, the system continues to search for the occurrence of pseudo errors. The purpose of this test is to prevent the transmission power from being decreased too soon after pseudo error is detected, i.e. a sufficient quality of the signal must first be ensured before the power level can be lowered again. On the other hand, if in phase 22 a sufficient time period is proved to have elapsed since the last pseudo error, the system also examines whether a sufficient time period (T2) has elapsed since the latest transmission power drop (phase 23). The purpose of this test is to prevent the power drops from occurring at too close intervals and to make sure that there is a sufficient time duration at each power level before the transmission power is lowered further. When this time interval has elapsed without any pseudo errors having been detected, the transmission power is lowered by a small predetermined amount ΔP2, such as 1 dB (phase 24).

At the start-up phase of the radio link system, i.e. when the power is switched on, the transmission power is preferably adjusted to its maximum value at both ends of the radio hop, as the link terminal does not yet know whether a lower power value will be sufficient for error-free reception. Only when the terminal receives a command from the opposite end to decrease the transmission power will it do so.

Figure 3:
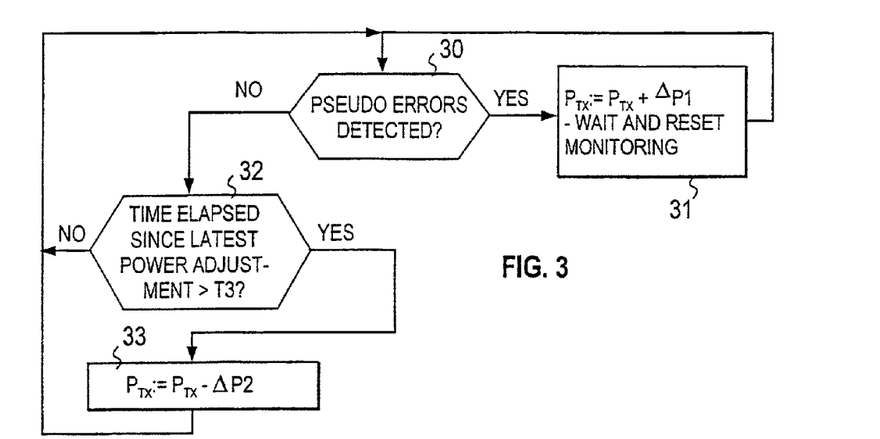
FIG. 3 is a flow chart illustrating another embodiment of the power control method in accordance with the present invention.

In the power control algorithm of FIG. 2, time period T2 is preferably appreciably longer than time period T1, for example, 2 to 10 times longer than T1. However, the time periods can also be equal, whereby phases 22 and 23 can be combined to form a single test, whereby it is tested whether a sufficient time period has elapsed since the latest power adjustment (decrease or increase). This embodiment is shown in FIG. 3. Thus, in this embodiment only one time variable must be maintained in the control unit.

As is obvious from the above, the transmission power is increased as rapidly as possible when pseudo errors are detected, but only as much as necessary. On the other hand, transmission power is decreased slowly until a minimum power level ensuring error-free reception is reached. This level depends on the prevailing conditions on the radio path, for example, on the weather conditions. As a result of the algorithm, the interval between two consecutive pseudo errors becomes rather lengthy in the normal operating state of the link system.

It is also possible to control the transmission power so that power is not increased immediately in response to each pseudo error, but the receiver first determines whether a predetermined condition has been fulfilled, for example, if a second pseudo error has occurred within a predetermined time interval after the last pseudo error or if a predetermined number of pseudo errors has been exceeded within a predetermined time interval. However, in preferred implementations of the invention, the transmission power is increased immediately after each pseudo error.

In the following, two different embodiments for accomplishing pseudo error monitoring are described.

According to the first embodiment of the invention, pseudo errors are detected by using a FEC (Forward Error Correction) coder in the transmitter and a FEC decoder in the receiver. FEC is a known error control method by means of which the receiving device is able to detect and correct any character or code block containing fewer than a predetermined number of erroneous symbols. FEC is accomplished by adding redundancy to each transmitted character or code block according to a predetermined algorithm. According to one feature of the FEC decoder, it can indicate if it has corrected one or more errors. This feature is utilized in the present invention so that these errors appearing at the decoder input are interpreted as pseudo errors, since they will be corrected in the decoder (assuming that the maximum performance of the decoder is not exceeded).

Figure 4:
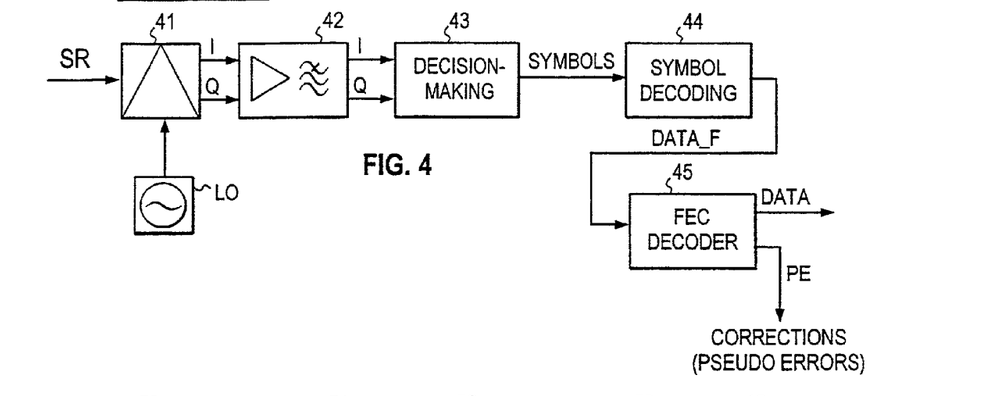
FIG. 4 shows one embodiment of a link terminal receiver that can monitor pseudo errors.
Figure 5:
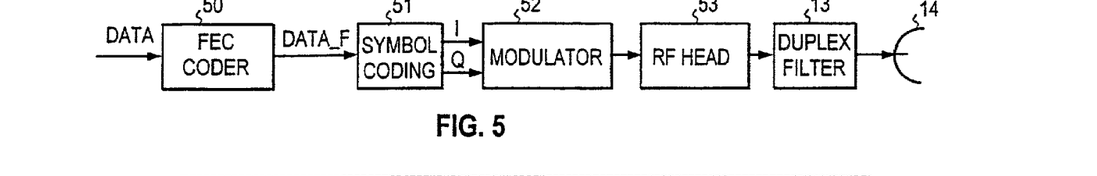
FIG. 5 illustrates a link terminal transmitter corresponding to the receiver of FIG. 4.

FIG. 4 illustrates a receiver utilizing a FEC coder for pseudo error monitoring, and FIG. 5 illustrates a transmitter sending coded bit stream to the receiver of FIG. 4. In the receiver, the received signal is supplied through the front end of the receiver (not shown in the figure) to a quadrature mixer 41 in which the signal is converted in a known manner by means of the signal of a local oscillator LO to baseband. If an intermediate frequency is used in the reception, the signal SR supplied to the mixer is an IF signal, or an RF signal is supplied if direct conversion to the baseband is used. Quadrature baseband signals I and Q output from the mixer are amplified and filtered in an amplifier stage 42 before being supplied to a decision-making unit 43. The decision-making unit determines which symbols are being received. The symbol stream is then decoded in a symbol decoder 44, whereby the original FEC coded bit stream DATA_F is received from the decoder output. This bit stream is then supplied to a FEC decoder 45, which performs forward error decoding by removing, in a known manner, the redundancy which is added to the baseband bit stream in the FEC coder 50 in the transmitter (FIG. 5). The FEC decoder has two outputs: the first output is for the corrected bit stream DATA and the second output is for the error signal (PE) indicating the corrections that the decoder has made. According to the invention, the corrections made the decoder are interpreted as pseudo errors by the control unit, which then adjusts the transmission power of the transmitter according to the above-described algorithm.

In the transmitter (FIG. 5), a FEC coder 50 is used as mentioned above. This coder is the last baseband signal processing unit in the transmission direction before modulator-related functions, i.e. it encodes the baseband bit stream, which is otherwise ready for transmission. The FEC coded bit stream is then supplied through a symbol encoder 51, an I/Q modulator 52, RF head 53, and the duplex filter (or switch) 13 to antenna 14.

The receiver and the transmitter of the above first embodiment can be implemented in many ways. The only essential factor for the invention is that the FEC is used for monitoring pseudo errors by utilizing the FEC decoder feature which determines whether there were errors at its input even though its output is error-free.

Figure 6:
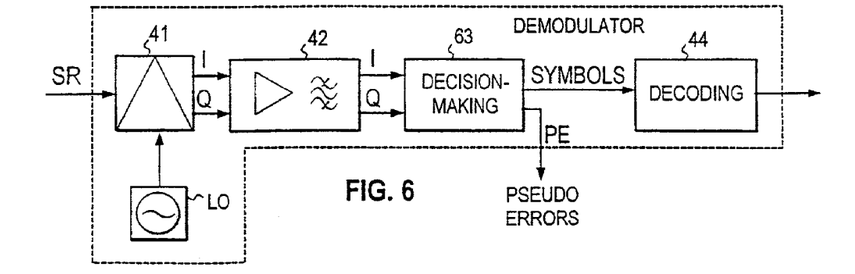
FIG. 6 shows an alternative embodiment of a link terminal receiver that can monitor pseudo errors.

According to the second embodiment of the invention, pseudo errors are detected by using extra decision thresholds in the demodulator. FIG. 6 illustrates a receiver utilizing a demodulator in this manner. In FIG. 6, the same reference numbers are used as in FIG. 4 for the same parts. As can be seen in FIG. 6, the information about pseudo errors is now received from the decision-making unit 63 provided with extra thresholds. In other respects the receiver is the same as in the first embodiment, except that no FEC decoder is needed.

Figure 7:
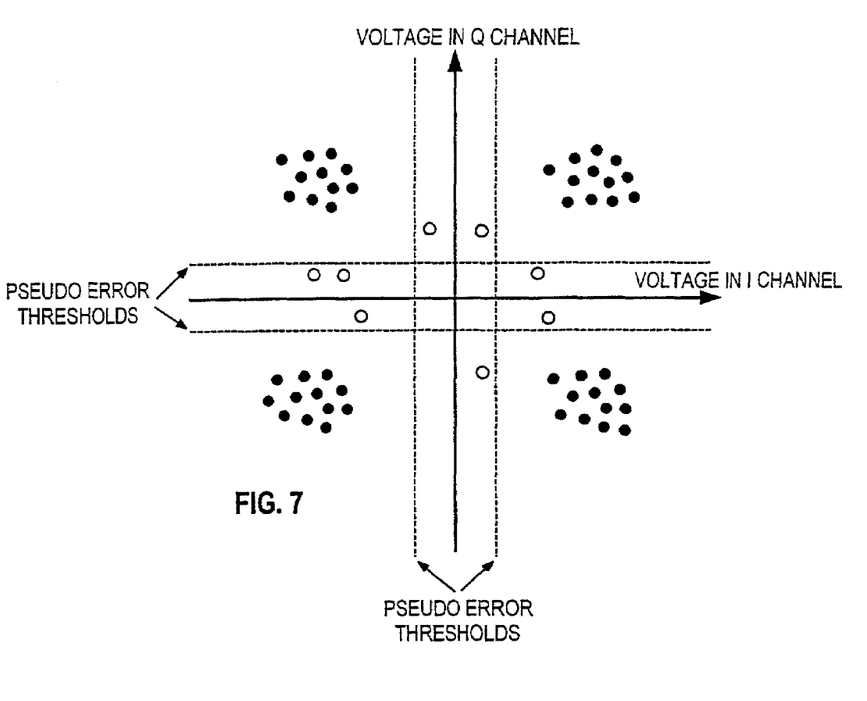
FIG. 7 illustrates the detection of pseudo errors in the receiver of FIG. 6.

FIG. 7 illustrates the detection of pseudo errors in the decision making unit 63, assuming that QPSK modulation is used in the transmission. The extra thresholds (i.e. pseudo error thresholds) are shown as dashed lines. The dots in the figure represent signal values at the decision moments; the white dots represent symbols which are regarded as pseudo errors, and the black dots represent symbols not regarded as pseudo errors. As can be seen from the figure, the thresholds are set so that if the signal value is close to any of the actual symbol decision thresholds at the instant of symbol decision, the event is regarded as a pseudo error.

In the above second embodiment, it is possible to obtain pseudo error data for every symbol, whereas in the above first embodiment, utilizing forward error correction, this data is received for every code block, i.e. less frequently than in the second embodiment. However, in practice this difference is of no significance, as in both cases the error data is received quickly as compared to the finite speed of power control. In other words, in practice the power control is so "slow" that pseudo error data can be received at an appropriate rate in both embodiments. It is also to be noted that the extra thresholds in the demodulator operate correctly if the error in the symbol is not so large that the symbol is clearly detected as one of the other symbols.

As mentioned above, in addition to pseudo errors other power adjustment criteria can be used in the power control. For example, signal monitoring means located in the receiver or in the control unit can measure the bit error rate continuously, in addition to monitoring the pseudo errors. In this way the algorithm based on pseudo errors can be overridden if the maximum performance of the pseudo error based algorithm is reached. In other words, if the error correction limits of the FEC decoder, for example, are reached so that too many errors begin to pass through the FEC decoder, the power control algorithm based on pseudo errors is temporarily overridden and the transmission power is immediately adjusted to its maximum value or to another high value. This additional measurement, which is used to override the pseudo error algorithm, can be any known measurement revealing the occurrence of actual errors.

There may also be a targeted received signal level set for the receiver as in prior art solutions. In that case, if this value is reached before the first pseudo errors occur, the reduction of the transmitter power ceases and, when necessary, the transmission power is increased.

The receiver can also monitor the rate of change of the received signal level as the receiver described in the above-mentioned EP-B1-0428099. In this case, if the received signal level is fluctuating faster than the power control system can respond, the transmit power can be increased to its maximum value until the fast signal level fluctuations disappear.

An additional advantage referred to only briefly in the above is that the power control mechanism can be implemented at low cost to existing receivers and transmitters, regardless of which of the above two implementation alternatives is chosen. in the first alternative, a known FEC mechanism can be utilized simply by monitoring the error output of the decoder. Moreover, the system may anyway use forward error coding for its primary purpose (for correcting errors), whereby the mechanism for pseudo error detection is obtained for free. In the second alternative, the extra thresholds can be implemented in the same ASIC circuit as the rest of the demodulator.

Even though the invention has been explained in the foregoing with reference to examples in accordance with the accompanying drawings, it is obvious that the invention is not restricted to these examples but can be modified within the scope of the inventive idea disclosed in the appended claims. The system need not necessarily be a conventional bidirectional point-to-point connection, but the same principle can be applied, for example, to unidirectional or point-to-multipoint radio connections with a suitable return channel for sending the power control messages.

The invention claimed is:

1. A method, comprising:
    transmitting a digital signal from a transmitting end to a receiving end of a radio system;
    receiving said digital signal at the receiving end;
    setting an initial value of transmission power so that no pseudo errors are detected, wherein a pseudo error is defined as an instant when a right bit or symbol decision was made, but a margin for the right bit or symbol decision was smaller than a limit value so that an actual error did not occur;
    monitoring pseudo error occurrence in the received digital signal at the receiving end;
    decreasing the transmission power gradually from the initial value at the transmission end when the pseudo error occurrence in an error-free reception does not fulfill a predetermined condition; and
    increasing the transmission power by a predetermined amount when the pseudo error occurrence in the error-free reception fulfills the predetermined condition.

2. The method as claimed in claim 1, further comprising: fulfilling the predetermined condition by detecting the pseudo error.

3. The method as claimed in claim 1, further comprising: fulfilling the predetermined condition by detecting a second pseudo error within a predetermined time interval after the last pseudo error.

4. The method as claimed in claim 1, further comprising: fulfilling the predetermined condition by detecting a predetermined number of pseudo errors within a predetermined time interval.

5. The method as claimed in claim 1, further comprising: increasing the transmission power immediately when the pseudo error is detected.

6. The method as claimed in claim 1, wherein the decreasing the transmission power comprises decreasing the transmission power in predetermined steps for a predetermined time period at each step.

7. The method as claimed in claim 6, further comprising: configuring the predetermined step to be 1 dB.

8. The method as claimed in claim 1, further comprising:
    adjusting the transmission power after the set-up of the radio system to the initial value high enough so that no pseudo errors are detected at the receiving end;
    decreasing the transmission power until a first pseudo error is detected;
    increasing the transmission power in response to the detected pseudo error; and
    jumping to the decreasing the transmission power until the first pseudo error is detected when no pseudo errors are detected during a predetermined time period after the transmission power has been increased in the increasing the transmission power in response to the detected error.

9. The method as claimed in claim 1, further comprising: configuring the predetermined amount for the increasing the transmission power to be 1 or 2 dB.

10. The method as claimed in claim 1, further comprising:
    using forward error correction in the transmitted signal;
    decoding the digital signal at the receiving end using a forward error correction decoder; and
    interpreting the corrections made by the forward error correction decoder as pseudo errors.

11. The method as claimed in claim 1, further comprising: using, at the receiving end, a demodulator provided with a first set of thresholds for making a decision on a received symbol and a second set of thresholds for making a decision on whether the pseudo error has occurred.

12. The method as claimed in claim 1, further comprising:
    monitoring the rate of actual errors at the receiving end; and
    increasing the transmission power temporarily to the maximum transmission power when a predetermined error rate threshold is exceeded.

13. A system, comprising:
    at a receiving end, a controller configured to monitor pseudo error occurrence in a received signal and to produce a control signal indicating when pseudo errors are detected and when the pseudo error occurrence in an error-free reception is below a predetermined condition, wherein a pseudo error is defined as an instant when a right bit or symbol decision was made, but a margin for the right bit or symbol decision was smaller than a limit value so that an actual error did not occur, and
    at a transmitting end, an adjuster configured to adjust transmission power responsive to said control signal by decreasing the transmission power when the pseudo error occurrence in the error-free reception does not fulfill the predetermined condition and by increasing the transmission power when the pseudo error occurrence fulfills the predetermined condition.

14. The system as claimed in claim 13, wherein said controller includes a forward error correction decoder configured to decode a forward error correction coded signal and configured to detect pseudo errors.

15. The system as claimed in claim 13, wherein said controller includes a demodulator provided with a first set of thresholds for making a decision on a received symbol and a second set of thresholds for making a decision on whether the pseudo error has occurred.

16. An apparatus, comprising:
a receiver, configured to
monitor pseudo error occurrence in a received signal,
produce a control signal indicating when pseudo errors are detected and when the pseudo error occurrence in an error-free reception is below a predetermined condition, and
wherein a pseudo error is defined as an instant when a right bit or symbol decision was made, but a margin for the right bit or symbol decision was smaller than a limit value so that an actual error did not occur.

17. An apparatus, comprising:
a power controller configured to adjust transmission power responsive to a control signal,
wherein the control signal is configured to indicate when pseudo errors are detected in a receiver and when pseudo error occurrence in the receiver is below a predetermined condition for an error-free reception,
wherein a pseudo error is defined as an instant when a right bit or symbol decision was made, but a margin for the right, bit or symbol decision was smaller than a limit value so that an actual error did not occur, and
wherein the radio transmitter is configured to adjust transmission power by decreasing the transmission power when the pseudo error occurrence does not fulfill the predetermined condition and by increasing the transmission power when the pseudo error occurrence fulfills the predetermined condition.

18. An apparatus, comprising:
a controller configured to
set an initial value of transmission power so that no pseudo errors are detected in a received signal in a receiving end of a radio link system, wherein a pseudo error is defined as an instant when a right bit or symbol decision was made, but a margin for the right bit or symbol decision was smaller than a limit value so that an actual error did not occur; and
adjust the transmission power responsive to a power control message received in the controller by decreasing the transmission power when pseudo error occurrence in an error-free reception does not fulfill a predetermined condition and by increasing the transmission power when the pseudo error occurrence fulfills the predetermined condition, wherein the power control message is based on information on pseudo errors detected in the received signal in the receiving end and provides indication whether pseudo error occurrence in an error-free reception fulfills the predetermined condition.

19. An apparatus, comprising:
a controller, configured to produce and send a power control message based on information on pseudo errors detected in a received signal and indicating whether pseudo error occurrence in an error-free reception fulfills a predetermined condition, and
wherein a pseudo error is defined as an instant when a right bit or symbol decision was made, but a margin for the right bit or symbol decision was smaller than a limit value so that an actual error did not occur.

20. A method, comprising:
sending, via an electronic transmitter, a digital signal;
setting an initial value of transmission power so that no pseudo errors are detected in a received signal in a receiving end of a radio link system, wherein a pseudo error is defined as an instant when a right bit or symbol decision was made, but a margin for the right bit or symbol decision was smaller than a limit value so that an actual error did not occur;
receiving a power control message, which is based on information on pseudo errors detected in the received digital signal in the receiving end and indicating whether pseudo error occurrence in an error-free reception is below a predetermined condition;
decreasing the transmission power from the initial value when the pseudo error occurrence in the error-free reception does not fulfill the predetermined condition; and
increasing the transmission power when the pseudo error occurrence fulfills the predetermined condition.

21. A method, comprising:
receiving, via an electronic receiver, a digital signal;
monitoring pseudo error occurrence in the received digital signal, wherein a pseudo error is defined as an instant when a right bit or symbol decision was made, but a margin for the right bit or symbol decision was smaller than a limit value so that an actual error did not occur;
producing a power control message based on information on pseudo errors detected in the received digital signal and indicating whether pseudo error occurrence in an error-free reception fulfills a predetermined condition; and
sending the power control message to a transmitting end of a radio link system.

22. An apparatus, comprising:
a transmitter first output configured to output a corrected bit stream, wherein the corrected bit stream is obtained by removing redundancy from a received bit stream; and
an error transmitter configured to output an error signal indicating corrections made by the apparatus to obtain the corrected bit stream, wherein the error signal provides information for producing a control signal, the control signal indicating whether pseudo errors are detected in a received signal and whether the pseudo error occurrence in an error-free reception fulfills a predetermined condition, wherein a pseudo error is defined as an instant when a right bit or symbol decision was made, but a margin for the right bit or symbol decision was smaller than a limit value so that an actual error did not occur.

23. A method, comprising:
transmitting a digital signal from a transmitting end to a receiving end of a radio system;
receiving said digital signal at the receiving end;
setting an initial value of the transmission power so that no pseudo errors are detected, wherein a pseudo error is defined as an instant when a right bit or symbol decision was made, but a margin for the right bit or symbol decision was smaller than a limit value so that an actual error did not occur;
monitoring pseudo error occurrence in the received digital signal at the receiving end;
decreasing the transmission power gradually from the initial value at the transmission end when the pseudo error occurrence in an error-free reception does not fulfill a predetermined condition;
increasing the transmission power by a predetermined amount when the pseudo error occurrence in the error-free reception fulfills the predetermined condition;

monitoring occurrence of actual errors in the received digital signal at the receiving end; and overriding transmission power control based on monitoring of occurrence of pseudo errors by increasing transmission power when actual errors are observed.

24. A system, comprising:

at a receiving end, monitoring means for monitoring pseudo error occurrence in a received signal and producing a control signal indicating when pseudo errors are detected and when the pseudo error occurrence in an error-free reception is below a predetermined condition, wherein a pseudo error is defined as an instant when a right bit or symbol decision was made, but a margin for the right bit or symbol decision was smaller than a limit value so that an actual error did not occur, and at a transmitting end, adjusting means for adjusting transmission power responsive to said control signal by decreasing the transmission power when the pseudo error occurrence in the error-free reception does not fulfill the predetermined condition and by increasing the transmission power when the pseudo error occurrence fulfills the predetermined condition.

25. An apparatus, comprising:

a controller configured to monitor the occurrence of pseudo errors in transmissions received from a transmitting end, a pseudo error defining an instant when a right bit or symbol decision is made but a margin for the right bit or symbol decision is smaller than a limit value so that an actual error did not occur, and to produce a control signal indicating whether a pseudo error has been detected, and a generator configured to generate power control messages based on control signals received from said controller, which power control messages are to be transmitted to said transmitting end, and wherein the power control messages are generated such that transmission power at said transmitting end is decreased until the pseudo error occurrence is above a predetermined level, and is increased when the pseudo error occurrence is above the predetermined level.

26. An apparatus as claimed in claim 25, wherein said controller includes a forward error correction decoder configured to decode a forward error correction coded signal and to detect pseudo errors.

27. An apparatus as claimed in claim 25, wherein said controller includes a demodulator provided with a first set of thresholds for making a decision on a received symbol and a second set of thresholds for making a decision on whether a pseudo error has occurred.

28. An apparatus as claimed in claim 25, wherein the predetermined level is the detection of a pseudo error.

29. An apparatus as claimed in claim 25, wherein the predetermined level comprises detecting a second pseudo error within a predetermined time interval after detection of a first pseudo error.

30. An apparatus as claimed in claim 25, wherein the predetermined level comprises detecting a predetermined number of pseudo errors within a predetermined time interval.

31. A method, comprising:

monitoring the occurrence of pseudo errors in transmissions received from a transmitting end, a pseudo error defining an instant when a right bit or symbol decision is made but a margin for the right bit or symbol decision is smaller than a limit value so that an actual error did not occur, and producing a control signal indicating whether a pseudo error has been detected; and generating power control messages based on control signals received, which power control messages are for transmitting to said transmitting end, and wherein the power control messages are generated such that transmission power at said transmitting end is decreased until the pseudo error occurrence is above a predetermined level, and is increased when the pseudo error occurrence is above the predetermined level.

32. A method as claimed in claim 31, wherein the predetermined level is the detection of a pseudo error.

33. A method as claimed in claim 31, wherein the predetermined level comprises detecting a second pseudo error within a predetermined time interval after detection of a first pseudo error.

34. A method as claimed in claim 31, wherein the predetermined level comprises detecting a predetermined number of pseudo errors within a predetermined time interval.

35. An apparatus, comprising:

a controller configured to control transmission power at a transmitting end based on power control messages, wherein the power control messages are generated based on control signals indicating whether a pseudo error has been detected in transmissions received from the transmitting end at a receiving end, a pseudo error defining an instant when a right bit or symbol decision is made but a margin for the right bit or symbol decision is smaller than a limit value so that an actual error did not occur, and wherein the power control messages are generated such that transmission power at said transmitting end is decreased until the pseudo error occurrence is above a predetermined level, and is increased when the pseudo error occurrence is above the predetermined level.

36. An apparatus as claimed in claim 35, wherein the predetermined level is the detection of a pseudo error.

37. An apparatus as claimed in claim 35, wherein the predetermined level comprises detecting a second pseudo error within a predetermined time interval after detection of a first pseudo error.

38. An apparatus as claimed in claim 35, wherein the predetermined level comprises detecting a predetermined number of pseudo errors within a predetermined time interval.

39. A method, comprising:

controlling transmission power at a transmitting end based on power control messages, wherein the power control messages are generated based on control signals indicating whether a pseudo error has been detected in transmissions received from the transmitting end at a receiving end, a pseudo error defining an instant when a right bit or symbol decision is made but a margin for the right bit or symbol decision is smaller than a limit value so that an actual error did not occur; and wherein the power control messages are generated such that transmission power at said transmitting end is decreased until the pseudo error occurrence is above a predetermined level, and is increased when the pseudo error occurrence is above the predetermined level.

40. A method as claimed in claim 39, wherein the predetermined level is the detection of a pseudo error.

41. A method as claimed in claim 39, wherein the predetermined level comprises detecting a second pseudo error within a predetermined time interval after detection of a first pseudo error.

42. A method as claimed in claim 39, wherein the predetermined level comprises detecting a predetermined number of pseudo errors within a predetermined time interval.

\* \* \* \* \*